Jan. 29, 1935. O. GILLIATT 1,989,231
APPARATUS FOR PRODUCING TOMATO PRODUCTS
Filed Oct. 17, 1930
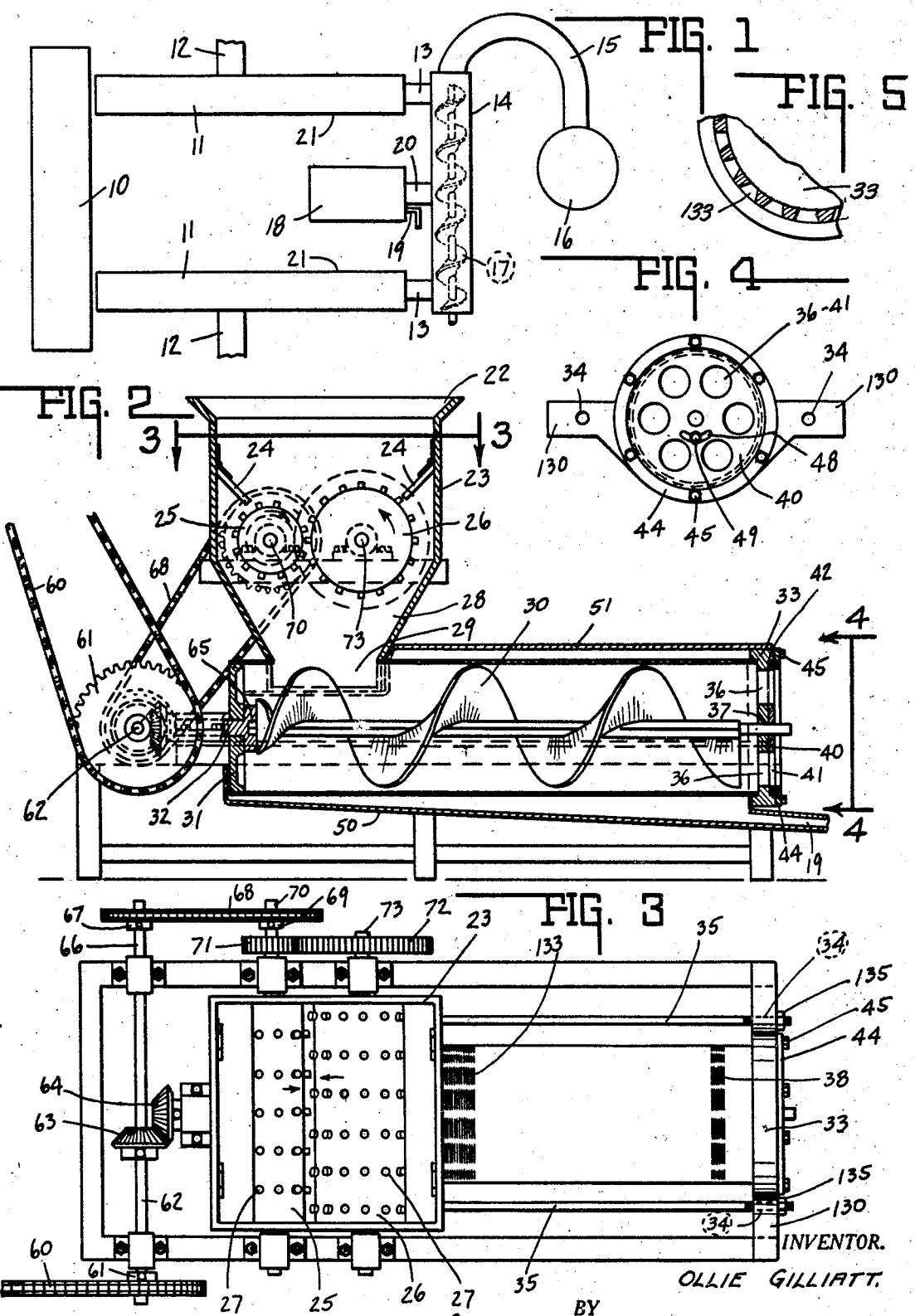
INVENTOR.
OLLIE GILLIATT.
BY
Lockwood Lockwood Goldsmith & Galt
ATTORNEYS.

Patented Jan. 29, 1935

1,989,231

UNITED STATES PATENT OFFICE 1,989,231

APPARATUS FOR PRODUCING TOMATO PRODUCTS

Ollie Gilliatt, Washington, Ind., assignor to Vincennes Packing Corporation, Vincennes, Ind.

Application October 17, 1930, Serial No. 489,332

2 Claims. (Cl. 100—48)

This invention relates to the method of and apparatus for preparing tomato products.

The chief object of this invention is to obtain a selected high quality juice from ripe tomatoes and which will not include the bitter constituent to be found in the core thereof.

Another object of the invention is to economically utilize all tomatoes that are suitable for canning purposes and in a manner which will best utilize the various types of tomatoes for the different tomato products. These tomato products are: canned tomatoes, tomato catsup, chili sauce, puree, sauce, and tomato juice.

The chief object of the invention is accomplished by apparatus which will handle ripe tomatoes in a certain way, such that but a part of the tomato is utilized for obtaining the juice therefrom and the remainder of the tomato is further utilized for other products.

The full nature of the invention will be understood from the accompanying drawing and the following description of claims:

In the drawing Fig. 1 is a diagrammatic top plan view of a portion of a tomato products producing plant embodying the invention.

Fig. 2 is an enlarged central sectional view through the apparatus which utilizes but a part of the tomato, the remainder being otherwise utilized.

Fig. 3 is a top plan view of the same apparatus and is taken approximately in the plane of line 3—3 in Fig. 2.

Fig. 4 is an end elevation of the apparatus shown in Figs. 2 and 3.

Fig. 5 is an enlarged sectional view through a portion of the strainer.

In the conventional tomato products plant there is provided a loading platform 10 and nearby some peeling and assorting lines 11. Leading from each assorting line there is an elongated belt conveyor 12. Each conveyor 12 leads to the tomato canning apparatus. Between the loading platform 10 and the assorting line 11 there is usually provided, although the same has been omitted herein for brevity, an assorting pit or vat that receives the tomatoes from the farmer or producer and the unripe tomatoes are returned to the farmer, likewise all tomatoes unsuitable for processing are also returned. The suitable tomatoes are then treated to permit the ready removal of the skins, and they pass down along the line 11, where the peelers and inspectors cut out various portions of the ripe tomato and remove the skins therefrom. As the belt conveyor moves from the loading platform down the line, the large ripe whole tomatoes are removed from the belt conveyor 11 at the station 12 and supplied to the cross conveyor, which carries them to the canning machine, where the large ripe whole tomatoes are canned, thereby giving a selected canned product.

The smaller ripe tomatoes and parts of ripe tomatoes which are not selected for canning are carried on down with the belt and if not otherwise removed therefrom are discharged into the chute 13 and then pass into receiver 14 and are discharged by gravity through the conduit 15 to a cyclone pulper 16. The product from the pulper is handled in the usual manner for making tomato puree or sauce for canning beans and spaghetti and the like.

In Fig. 1 two conveyors 11 are illustrated and the discharges 13 therefrom are each discharged into the receiver 14, and mounted therein is a screw conveyor 17, which discharges the material supply to the receiver 14 to the gravity conveying conduit 15 and in connection with the cyclone pulper. Intermediate between the two assorting and peeling lines 11 is an apparatus indicated generally by the numeral 18, which has a conduit discharge 19 and a larger discharge 20, the latter of which also discharges into the receiver 14, so that the pulp body that passes through the passage 20 is discharged into the receiver 14. The material received by the apparatus 18 consists of the small ripe tomatoes, and these are taken off at the peeling and assorting line at the station 21.

The reason that the small ripe tomatoes are utilized is because the larger whole tomatoes have been removed for canning, and the parts of tomatoes have a broken core or a cut core and the tearing, crushing or otherwise mutilating of this core will free a bitter constituent that will impart a bitter taste to the raw tomato juice. The little whole ripe tomatoes therefore have a protected core and are therefore selected, removed from the belt 11 and are supplied to apparatus 18 and they are so treated in this apparatus before a part of the juice is removed therefrom and in such a manner that the core is not disturbed, so that the bitter constituent of the core does not enter into any of the juice separated by the separator apparatus. The pulp, including the core and body of the tomato, is discharged from the apparatus through the conduit or passage 20 as before mentioned and further utilized in sauce and puree. The conduit 19 is the discharge line from the apparatus for the pure, raw tomato juice, and this conduit may supply the same to suitable apparatus for bottling or for packaging the same, for example, bottling or canning, as found desirable in the trade.

The purpose of this apparatus, as before mentioned, is to produce a pure tomato juice which will be sweet and not bitter, and therefore palatable in itself. Tomato juice in the past few years has had an enormous demand created for it. It contains many valuable vitamines and therefore is a recognized constituent in infant diet. It has also a particular affinity for alcohol, so that drug stores and restaurants within the past year have been selling enormous quantities of tomato juice to adults for this purpose, in addition to the desire of the purchaser to acquire the vitamines. Inasmuch as this juice is taken internally in its raw state, the matter of taste or rather bitterness is extremely important, as will be readily apparent.

Apparatus suitable for effecting the aforesaid selective and highly desirable separation is illustrated in detail in Figs. 2, 3 and 4. In these figures there is illustrated a hopper-like mouth 22 and a vertical passage 23 supplied thereby. Longitudinally mounted in the passage 23 are the deflectors 24, which serve to direct the tomatoes supplied to the hopper toward the center of the passage. Rotatably mounted in said passage, side by side, are a pair of tearing and disintegrating rolls in the form of cylinders 25 and 26. These cylinders are in spaced relation to each other and rotate oppositely and towards each other. Each roll is provided with a plurality of pins or round teeth 27. As shown in Fig. 3 these teeth on each roll are arranged in parallel planes and the planes of the teeth on opposite rolls are alternate, so that the pins or teeth do not engage each other. The tomatoes supplied to the hopper fall upon the surface of the top portion of each of the rolls and are conveyed towards the center and are partially crushed and drawn apart. The construction is such that these rolls and pins do not tear or crush the core of the tomato, so that the bitter constituent therein is not exposed nor discharged into the juice but carries over with the core. Beneath the passage 23 and leading from beneath the rolls is a chute 28 that discharges into the mouth 29 of a horizontally arranged self-cleaning strainer.

The strainer consists in an elongated tube peripherally slotted and enclosed by a casing which collects the juice discharged therefrom. Mounted in the strainer is a helicoid conveyor and cleaner 30. The end of the strainer is closed as at 31 but is apertured to receive a rotating shaft 32, operatively associated with the helicoid 30 for rotating the same. These straining slots each are elongated and V-shaped in cross-section and are arranged side by side in both peripheral and longitudinal spaced relation, the longitudinal spacing between adjacent slots being less than the peripheral spacing between adjacent slots, for structural strength. Each slot has an inner width of about four one thousandths of an inch and the projected vertex thereof is positioned within the elongated tubular strainer. These slots will be self-freeing, in that anything that passes through will continue and will pass out from the slots. The helicoid is so constructed that in its rotation it presses the crushed tomatoes toward the center of the strainer and discharges the pomace or body through the discharge end of the strainer.

The discharge end of the strainer includes a plate 33, which is suitably apertured as at 34 to receive the anchoring bolts 35. Plate 33 includes a plurality of spaced openings 36 therein and said plate also includes a bearing 37 for the other end of the helicoid shaft. The helicoid therefore is supported in spaced relation within the strainer so that it will just clear the same and by reason of this arrangement the helicoid does not force any pulp or pomace through the openings 133 in the strainer. As shown in Fig. 3 the openings are arranged in rows but terminate short of the discharge end, as indicated by the last openings 38. The purpose of having the strainer solid or substantially imperforate at this end is that the pomace accumulates at this end and would be forced through the openings 133, instead of the openings 36. The helicoid not only draws the pomace to the center of the strainer chamber but also feeds it forwardly to the discharge end and through the discharge openings 36.

What might be called the regulation of the back pressure or discharge resistance is obtained by the addition of a plate 40 having a like number of openings 41 for registration with the openings 36. The closure 33 has a seat 42 which rotatably supports plate 40. An anchoring ring 44 retains this plate against axial displacement and the bolts 45 secure this retaining ring 44 to the closure plate 33. To regulate the so-called back pressure or resistance to discharge, and this it may be observed regulates the proportion of juice that is extracted from the crushed material, the arcuate slot 48 is provided in plate 40 and the clamping stud 49 is associated therewith and is carried by the stationary closure plate 33, and through this construction the percentage of full registration of the openings 36 and 41 is adjusted and maintained.

The casing surrounding the straining cylinder is in two parts. The upper half 51 is removable and the lower half 50 is rigidly mounted and is inclined downwardly toward the outlet 19.

Any suitable framework or mounting may be utilized for the mechanism before described. Suitable power mechanism is also arranged therewith. Herein power is shown obtained from a power chain 60, which meshes with a sprocket gear 61 carried by shaft 62. Shaft 62 mounts intermediate its ends, a bevel gear 63 which meshes with a beveled pinion 64 which is rigid with the helicoid shaft. The helicoid shaft preferably has a detachable non-rotatable connection 65 therewith so that when the discharge end plate 33 is removed by removing nuts 135 from the rods 35 mounted in the ears 130 of the plate 33 said plate and the shaft may be readily removed for cleaning the same and for cleaning the interior of the straining cylinder.

Shaft 62 is extended as at 66 and a sprocket gear 67 drives a chain 68 which drives another sprocket gear 69 carried by the shaft 70. Shaft 70 is the shaft which mounts the smaller crushing cylinder 25. It also mounts a spur gear 71 and meshing therewith is a larger spur gear 72 carried by shaft 73, which supports the larger crushing cylinder. The ratio of the gearing is about 3 to 1 and is suitably timed and, as will be observed from the foregoing, the rotation of the helicoid and the rotation of the cylinders are likewise timed.

The invention claimed is:

1. In a juice and pomace separator, the combination of a pair of ends, a cylindrical strainer associated with said ends, a shaft supported coaxially therein by said ends, a helicoid carried by said shaft, one of said ends having a central aperture, a driving bearing rotatably supported in the central aperture and detachably associated with the shaft within the strainer for supporting and driving of the shaft, the other end including a plurality of apertures communicating with the strainer interior, a cooperating closure apertured similar to the last mentioned end and positioned adjacent thereto, and means for securing said closure and end together in adjusted position to secure predetermined restrictive discharge of the pomace longitudinally of the strainer, said strainer being of the self freeing type and having a plurality of elongated, V-shaped in cross section, slots therein, said slots being arranged side by side longitudinally of the strainer and also arranged in spaced peripheral series, the projected vertex of each slot being positioned within the interior of the strainer and the spacing between the slots of the same longitudinal series being appreciably less than the spacing between a peripheral series of slots.

2. In a juice and pomace separator, the combination with a helicoid compactor and conveyor, of an elongated substantially cylindrical straining chamber at one end of which crushed and torn tomatoes are directly supplied for compaction and advance by the helicoid compactor and conveyor, the helicoid having its free edge terminating immediately adjacent the inner surface of said cylindrical chamber, means for rotating said helicoid to secure the advance of pomace therethrough, said helicoid in its rotation drawing the pomace from the chamber wall toward the center of the helicoid, a restrictive closure for the discharge end of the chamber consisting of a plate having a plurality of apertures therein in spaced relation, another plate in juxtaposition thereto and similarly apertured, and means for securing said plates together in juxtaposition for regulating the amount of restriction in the chamber discharge, said cylindrical straining chamber being of the self freeing type and having a plurality of elongated V-shaped in cross section, slots therein, said slots being arranged side by side longitudinally of the strainer and also arranged in spaced peripheral series, the projected vertex of each slot being positioned within the interior of the strainer and the spacing between the slots of the same longitudinal series being appreciably less than the spacing between a peripheral series of slots.

OLLIE GILLIATT.